(12) United States Patent
Sri et al.

(10) Patent No.: US 9,055,148 B2
(45) Date of Patent: Jun. 9, 2015

(54) METHOD AND APPARATUS FOR ANALYZING LEAKAGE FROM CHAT TO VOICE

(71) Applicant: 24/7 Customer, Inc., Campbell, CA (US)

(72) Inventors: R. Mathangi Sri, Bangalore (IN); Nitin Kumar Hardeniya, Bangalore (IN); Vaibhav Srivastava, Bangalore (IN); Ravi Vijayaraghavan, Bangalore (IN)

(73) Assignee: 24/7 Customer, Inc., Campbell, CA (US)

( * ) Notice: Subject to any disclaimer, the term of this patent is extended or adjusted under 35 U.S.C. 154(b) by 0 days.

(21) Appl. No.: 14/149,768

(22) Filed: Jan. 7, 2014

(65) Prior Publication Data

US 2014/0192971 A1     Jul. 10, 2014

Related U.S. Application Data

(60) Provisional application No. 61/750,216, filed on Jan. 8, 2013.

(51) Int. Cl.
*H04M 11/00* (2006.01)
*H04M 3/51* (2006.01)

(52) U.S. Cl.
CPC .................................. *H04M 3/5191* (2013.01)

(58) Field of Classification Search
USPC ........................................ 379/93.17; 709/229
See application file for complete search history.

(56) References Cited

U.S. PATENT DOCUMENTS

| | | |
|---|---|---|
| 2005/0288939 A1 | 12/2005 | Peled et al. |
| 2008/0177538 A1 | 7/2008 | Roy et al. |
| 2010/0070448 A1 | 3/2010 | Omoigui |
| 2010/0138282 A1 | 6/2010 | Kannan et al. |
| 2011/0083190 A1 | 4/2011 | Brown et al. |
| 2011/0158398 A1 | 6/2011 | Kannan et al. |
| 2011/0205331 A1 | 8/2011 | Kato |
| 2012/0076283 A1 | 3/2012 | Ajmera et al. |
| 2012/0233258 A1 | 9/2012 | Vijayaraghavan et al. |

OTHER PUBLICATIONS

Reitter, David et al., "Hybrid natural language processing in a customer-care environment", Proceedings of the 11th Student Conference on Computational Linguistics (TaCoS). 2001 (2001). Retrieved on Apr. 13, 2014 (Apr. 13, 2014) from <http://citeseerx.ist.psu.edu/viewdoc/summary?doi=10.1.1.19.4710>, 2001, 15 pages.

*Primary Examiner* — Quynh Nguyen
(74) *Attorney, Agent, or Firm* — Michael A. Glenn; Perkins Coie LLP

(57) ABSTRACT

The customer experience is enhanced by detecting leakage-to-voice from chats and providing recommendations to operations, chat agents, and customers. A chat is classified into leakage-to-voice or leakage-to-text chat and actionable recommendations are then provided to operations, chat agents, and customers based on the leakage information. Once leakage is identified, various other insights are extracted from chats and such insights are fed into the knowledge-base. Such insights also used in agent training and are provided to chat agents as recommendations. This results in a better customer experience.

36 Claims, 10 Drawing Sheets

Thank you for choosing Optus. Please wait for an Optus Representative to respond. You are currently number *** in the queue. You should be connected to an agent in approximately *** minutes.

Thank you for choosing Optus. Please wait for an Optus Representative to respond. You are currently number ***** in the queue. Thanks for your patience.

You are now chatting with 'Ruby'

Hi there! Welcome to Optus Live Chat. How can I help you today?

where do I find my network key to connect my laptop to my wireless internet

Is it for a mobile broadband service?

yes my home computer is already set up and connected just need to network ket to add the laptop key Can I have the service number please?

whats that

You said that it is a wireless service, is it a post or a prepaid service?

its a naked adsl post paid service

I see. I'll be needing to refer you to Technical Support for the modem password. Please call them on ***. They are available * by ***.

Sorry for the inconvenience for we don't have chat for that department yet.

wow. cant you just tell me where in the computer i need to look to find the network key\ cant be that hard

As much as we would want to, you have reached the fixed department and we don't have chat for Technical Support yet.

We only deal with billing enquiries for fixed services.

you know what I just find it. Its located underneath the modem. for your info

FIGURE 3

Hi and welcome to our Capital One chat service! One of our Account Specialists will be right with you. $$You are now chatting with Priscila
Whom do I have the pleasure of chatting with today? $$Thank you for visiting Capital One. I'd be happy to help you with your account questions.
Anne-Marie Cioffi
Hello Anne, how may I assist you today?
I would like to make a $*****.00 payment on Friday. I see that there is no balance due and it will not let me do this as the due date has passed.
Let me check that for you. $$To ensure we have the correct information on file, I'd like to verify some information with you. Would that be okay?
Yes
May I have your first and last name as it appears on your credit card, the last four digits of your Capital One account number, and your zip code?
Anne Marie Cioffi - 9*****

May I please have your date of birth and the last four digits of your social security number?
12-03-1952 0667

Thank you. Please bear with me a moment while I review your account information. $$I have reviewed your account and I see that your due date is on 8/29/2011. I see that your first statement will get generated on 9/24/2011, and your first due date will be on 10/21/2011.
Okay thanks, but can I make a payment before that.

Once your first statement is generated you will be able to make the payments through online. However if you wish you can make the payments via phone by contacting us at *****. A Customer Service Representative is available 24 hours a day, 7 days a week and will be happy to assist you with this request. $$You are welcome.$$Is there anything else I can help you with today?
No thank you. You were very helpful. I don't want to be late on any payments.

Thank you.$$I can appreciate your thought.$$Have a great day.$$My goal today was to provide you with outstanding customer service. I hope I was able to meet that goal for you. If you'd like to provide feedback about your experience with us today, please click the button that reads â€œEnd Chatâ€ at top right to answer a few quick questions.

Good morning Chris.
I am wanting to check on a part for Sears 42" Craftsman Professional Riding Mower.$$The Model # of the mower is ***
Thank you for the model number.$$I'll be more than happy to help you locate the part for you. $$Can I know what part are you referring to?
1 of each.$$The blades are 37.99 for a set$$on the Sears Parts Website$$I don't know the cost of the airfilter Let me check please.$$Blades will cost you $35.99 and the air filter will cost you only $18.91.
Ok, let's place the order
1 of each item1 blade set and 1 airfilter                          62
**Sure.$$I have a wonderful offer with which you can save "Shipping fee dollar amount" on your shipping fee on this order.
Ok, tell me more   ←———————— 64
Do you have a refrigerator at home?
I'd like to get a oil change kit for this riding mower. It usually includes an oil filter and a pre-measured quantity of oil.$$I'd also like to get a the drive deck belt for the mower.
Sure.
Let me summarize your order.
You have order for 1 air filter, 1deck belt, 1 oil filter and one mulch blade kit and your total cost including shipping and tax is $132.02 and the estimated date of arrival is Aug 9.
Basically, is everything in stock $$?
ok                                                    ←———— 66
**Please allow me a moment to submit your order and give you the order confirmation number.
Please place the order. Thanks.$$Will I receive an email confirmation on the order?    68
Your order number is C*.$$Yes you will receive an email confirmation also
As you are a valued customer, I would like to take this opportunity to let you know that Sears offers "FREE, No Obligation€
in-home consultations for kitchen remodeling, roofing, cabinet refaxing, replacement windows, siding, front entry doors and new h
I think that should take care of everything I need today$$Thank you for your help
Okay.$$My pleasure.$$Is there anything else that I may assist you with today?

METHOD AND APPARATUS FOR ANALYZING LEAKAGE FROM CHAT TO VOICE

CROSS REFERENCE TO RELATED APPLICATIONS

This application claims priority to U.S. provisional patent application Ser. No. 61/750,216, filed Jan. 8, 2013, which application is incorporated herein in its entirety by this reference thereto.

BACKGROUND OF THE INVENTION

1. Technical Field

The invention relates to on-line chat. More particularly, the invention relates to enhancing the customer experience by identifying chats that are redirected to other channels.

2. Description of the Background Art

When a customer is unable to solve a service or product problem using chat with an agent of the service or product provider, in frustration the customer may leave the chat and contact the service or product provider through another channel, such as by a voice call. Redirection or leakage of chats from one channel to other channel is common in a customer service environment. Unfortunately, an increase in the number of leakages can degrade the customer experience, chances of possible sales, and can also lead to customer dropout, where the customer gives up. The most common leakage of chats is leakage-to-voice chat.

SUMMARY OF THE INVENTION

The problem of leakage-to-voice from chats is commonly faced by operation managers and chat agents. This may lead to a degradation of the customer experience and productivity of sales team. Embodiments of the invention enhance the customer experience by detecting leakage-to-voice from chats and by providing recommendations to operations, chat agents, and customers. In embodiments of the invention a chat is classified into leakage-to-voice or leakage-to-text chat and actionable recommendations are then provided to operations, chat agents, and customers based on the leakage information. Once a leakage is identified, various other insights are extracted from chats and such insights are fed into a knowledge-base. Such insights also used in agent training and are provided to chat agents as recommendations. This results in a better customer experience.

BRIEF DESCRIPTION OF THE DRAWINGS

FIG. 3 provides an example of a chat transcript according to the invention;

FIG. 6 is a chat transcript showing voice-of-the-customer (VoC) visualization of a service chat according to the invention;

FIG. 7 is a chat transcript showing VoC visualization of a sales chat according to the invention;

DETAILED DESCRIPTION OF THE INVENTION

A fundamental business objective is to provide customers with a level of customer support that meets their needs and expectations, while using the most cost effective techniques. Embodiments of the invention use model-based techniques to analyze the causes of leakage, i.e. leakage of chats from one channel to another channel, and to use the results of the analysis to make recommendations to agents and managers. An increase in the number of leakages is of concern to customer support organizations because such increase can lead to or cause a degradation of the customer experience.

Embodiments of the invention analyze leakages, i.e. transfers, of customer chats on one channel to another channels. Various devices and communications channels are used to establish a chat session between a customer, also referred to herein as a user, and a support agent. The contents of the chat are analyzed, for example, to make recommendations of goods and services to the customer. Otherwise, the customer's chat may be redirected to another channel, such as voice, resulting in leakage. The customer's information is confirmed and retained. A model is generated and used to analyze the chat information and the leakage information.

When a chat leakage is identified, the chat is analyzed to determine factors that may have contributed to the leakage. The data pertaining to the leakage and the analysis results are stored in a knowledge base. The information, and analysis thereof, stored in the knowledge base is then used for the training of agents and to make recommendations to agents and managers with the ultimate objective of improving the customer experience.

Embodiments of the invention enhance the customer experience by classifying chats into leakage-to-voice or leakage-to-text chats. Data about the leakage is used to provide recommendations, and specific training, to chat agents for such purposes as to solve customer queries efficiently, provide insight solutions, and enhance the customer experience.

Figure 1:
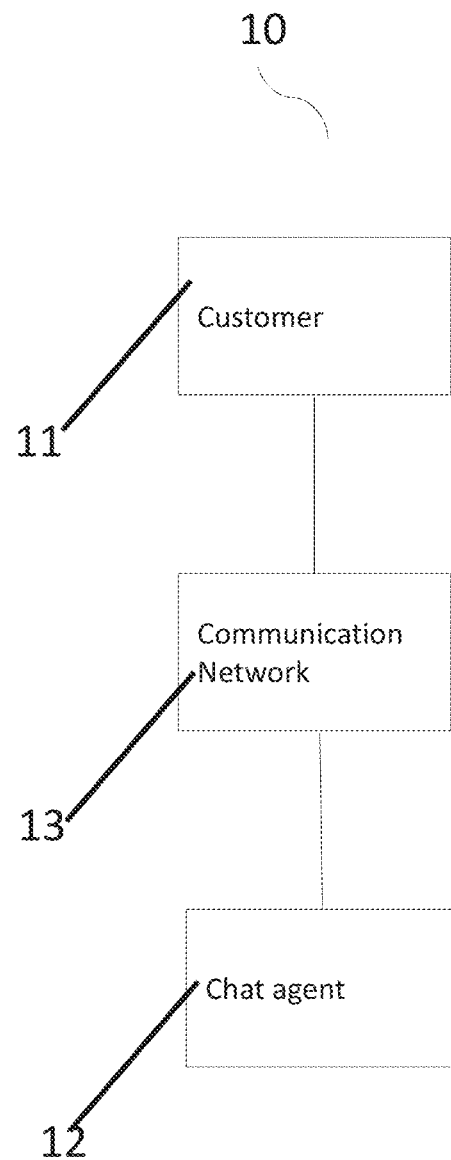
FIG. 1 is a block schematic diagram showing a system in which a customer communicates with a chat agent according to the invention.

FIG. 1 is a block schematic diagram showing a system in which a customer communicates with a chat agent according to the invention. In FIG. 1, the system 10 connects a customer 11 with a chat agent 12. The customer 11 communicates with the chat agent 12 over a communications network 13. In embodiments of the invention, the communications network 13 is any of the Internet, a cellular-based communications network, a wireless communications network, a wire line communications network, a Global System for Mobile Communications (GSM) network, a combination thereof, or any other communications network.

The customer 11 uses a customer device to communicate with the chat agent over the communications network. In an example, the customer device can be any of a mobile phone, a handheld device, a tablet, a computer, a portable device, a communicator, or any other device that is capable of communicating with the communications network 13. The communications network 13 can use any suitable communication technology to communicate with the customer 11. The system allows the customer 11 to access, for example, an application, a Web portal, or a website to communicate with the chat agent over the communications network. For example, when a customer is looking for a product, requires any type of assistance, or has a query, the customer can login or provide specific information to the Web portal to communicate with the chat agent. In various embodiments of the invention, the chat agent can be a voice chat agent, a text chat agent, a video chat agent, or any other chat agent capable of communicating with the customer.

The chat agent can provide insight solutions to customer issues or can redirect the chat to other channels to resolve customer issues. For example, a chat might proceed as follows:

You can call the payments team on 08448 260 290 between Monday to Friday 8 am to 8 pm and Saturday and 9 am to 6 pm. Calls to this number is chargeable at a standard rate.

If you dial 202 from any O2 Pay Monthly mobile it would be free of charge.

In the foregoing example, the following would occur:

You can call our customer support team on this contact no" -→voice transfer

I am transferring this chat to our iPhone team they will help you out with this -→chat transfer Further, the chat agent can check the information related to the customer. Such information can include, for example, the customer's journey, the customer's communication history, the customer's interests, and any other information associated with the customer. For example, the customer's journey can refer to the chat agents, either a voice or a text chat agent, who interacted with the customer before the customer visited a specific chat agent; the path taken by the customer to reach the chat agent, such as by clicking on a link present on an internal or external site; the customer's Web-log journey; or any other customer information. The customer journey can be any of a virtual journey, a literal journey, an assisted journey, a guided journey, or a combination thereof.

Based on the information related to the customer, the chat agent provides insight solutions to the customer. For example, a chat might proceed as follows:

Thank you. Please bear with me a moment while I review your account information. $$I have reviewed your account and I see that your due date is on Aug. 29, 2011. I see that your first statement will get generated on Sep. 24, 2011. and your first due date will be on Oct. 21, 2011.

Or:

If you can log-in directly onto our website using your desktop/laptop—through MyAccount—you will see your right and proper info there. Your username: BLU-EYoner1. DJ: Can you still remember your password or let me know if you need me to reset it for you.

Furthermore, the chat agent can store information about the customer in a suitable location.

Figure 2:
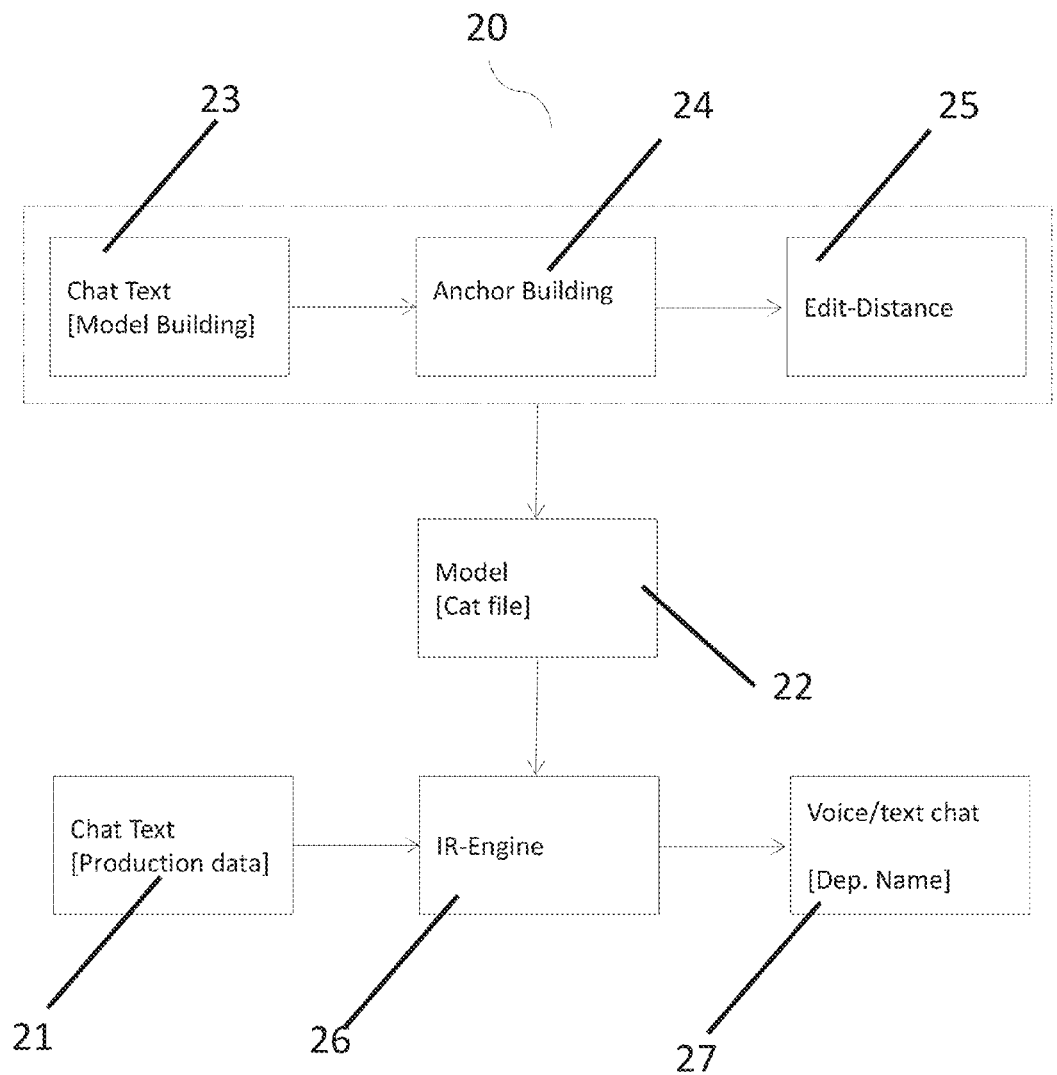
FIG. 2 is a block schematic diagram showing a system for detecting leakage-to-voice according to the invention.

FIG. 2 is a block schematic diagram showing a system for detecting leakage-to-voice according to the invention. In FIG. 2, a leakage-to-voice architecture 20 is shown, in which the system 10 (see FIG. 1) is configured to identify a class of the leakage, e.g. whether the leakage is a voice chat leakage or a text chat leakage. In this embodiment, the system is also configured to identify the channel to which leakage occurs because different channels can be associated with a customer to provide assistance.

In an example, as shown in the FIG. 2, sample production data 21 is used to build a model 22. To do this, the channel names are identified from anchors and by using a window of words around the anchor, which are referred to herein as filters. Different approaches may be used for building these anchors namely, using word contexts, noun extraction, or noun phrase extraction. The type of channel to which leakage has occurred, for example chat or voice, is identified by providing a window of 'n' words around the anchors to identify the filters, e.g. transfer, talk to, customer service rep, etc. Once the anchors and filters are identified, the exact channel is identified using a priority matrix. For instance, if a team name is present, i.e. the anchor is present, and voice filter is present, e.g. talk to, then the channel is a voice channel. If team name is present and the chat filter is present and the voice filter is also present, then this could possibly be a chat transfer.

In an embodiment of the invention, a chat text 23 is used to build an anchor 24. Production data is actual customer interaction data that is saved in the database at the end of each day. An anchor comprises key phrases and/or words around which the line is centered. For example, extracting a few words around words such as "Department," "team," etc. from a text corpus yields a possible list of all the different types of departments and/or teams. Here, the words "Departments" and "team" are referred to as anchor words.

In embodiments of the invention, the chat text 23 is the text provided by the chat agent 12, but the chat text could as well be provided by the customer. The channel names referred in the chat text are extracted to build the anchor 24. FIG. 3 provides an example of a chat transcript according to the invention.

Figure 4:
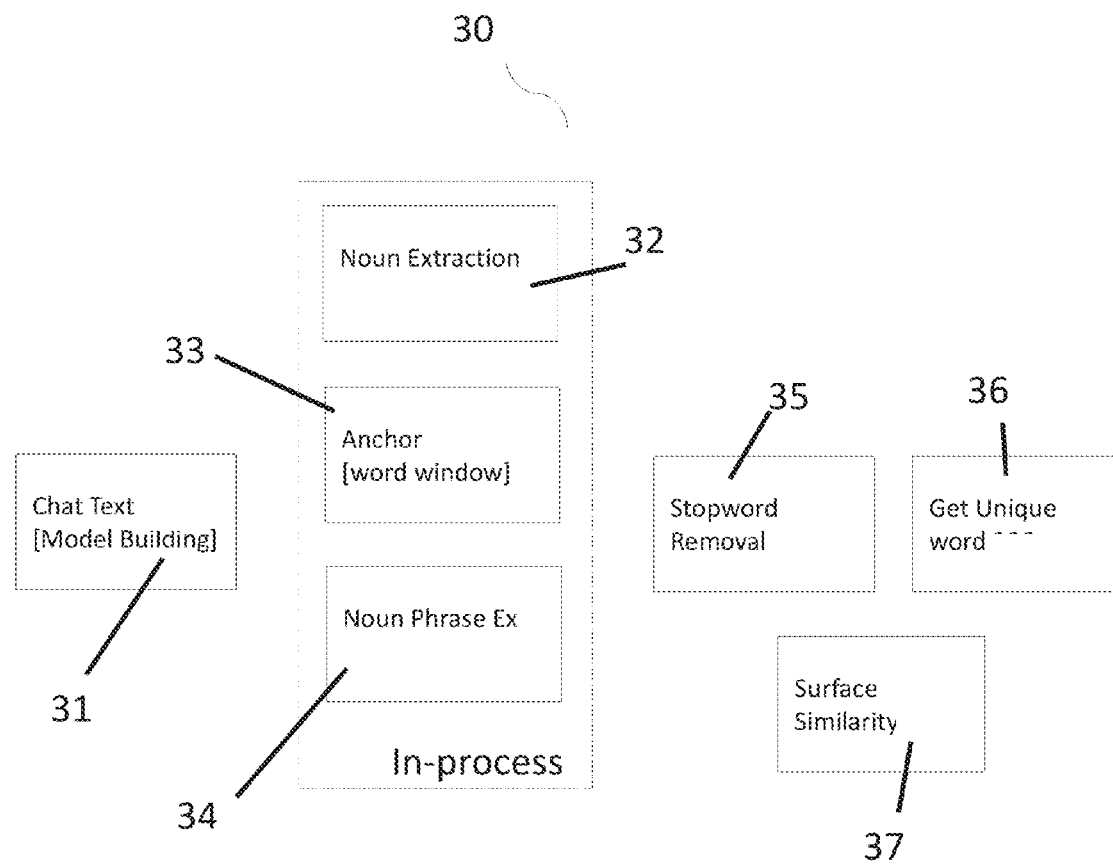
FIG. 4 is a block schematic diagram showing an anchor building process, as described in connection with FIG. 2, according to the invention.

FIG. 4 is a block schematic diagram showing an anchor building process, as described in connection with FIG. 2, according to the invention. Once the anchor building process is completed, a temporary categorization of the team/department, for example iPhone-team, customer service department, is obtained. For purposes of the discussion herein, team/department refers to the customer service team to which either the customer is advised and/or routed to talk to or chat with.

One approach to temporary categorization involves the use of edit distance, which is a way of quantifying how dissimilar two strings, e.g. words, are to one another by counting the minimum number of operations required to transform one string into the other. In embodiments of the invention, edit-distance 25, i.e. surface similarity, is used to obtain a temporary categorization of the team/department using positive hits generated by the anchor building process. For purposes of the discussion herein, hits come from the text corpus on which the anchor building process is run. For example, a particular team/department may be grouped with the wrong team/department due to natural language variations, e.g. the 'callback team' is grouped in the 'support team' because the support team takes any incoming calls; the 'Billing investigation team' is grouped in the 'billing team' because bill investigation is about disputes and, hence, a separate team.

To address such problem, an initial grouping of some of the teams/departments is performed by business analysts using business sense for the teams/departments and customer needs. Embodiments of the invention provide a service layer, where business understanding is applied to correct and regroup the different departments and/or teams. In the above example, a domain expert corrects these groups manually.

In an embodiment of the invention, a service layer is applied to fine tune mapping and generate a model 22 that includes a final cat file for the team/department names. For purposes of the discussion herein, the cat file contains the categories into which the text corpus is categorized. The cat file can include, for example, a categories grouping of the team/department names based on the edit distance 25. Once the model 22 is generated, an information retrieval (IR)

engine 25 can be used to categorize the chat data into the team/department names. In embodiments of the invention, the IR engine is an information retrieval system that includes a method of representing documents as transformed variables, querying them, ranking them based on computation of numerical scores, and retrieving the most relevant documents that match the query.

In embodiments of the invention, the system 10 also applies specific filters 27 for voice and text chat categorization. Generally, these filters 27 and the team/department names occur in a periphery of a predefined number of words. For example, most of the time the chat agent may say "I am transferring the chat to our customer solution team" or "please call our iPhone team." Instead of taking the entire agent text, the voice and text chat filters 27 create dummy data having a periphery of the predefined number of words. The dummy data is provided with a dummy identifier, for example, [ID21111 1]. The dummy identifier marks the presence or absence of voice and/or chat filters. The identifier is later fed into the priority matrix. This in turn decides the channel of transfer.

In an embodiment of the invention, a priority index is provided to control each of the filters 27. The channel names are identified from anchors and by using a window of words around the anchor, which are referred to herein referred as filters. Different approaches may be used for building these anchors namely, using word contexts, noun extraction, or noun phrase extraction. The type of channel to which leakage has occurred, for example chat or voice, is identified by providing a window of 'n' words around the anchors to identify the filters, e.g. transfer, talk to, customer service rep etc.

Once the anchors and filters are identified, the exact channel is identified using a priority matrix. For instance, if a team name is present, i.e. the anchor is present, and voice filter is present, e.g. talk to, then the channel is a voice channel. If the team name is present and the chat filter is present, and the voice filter is also present, then this could possibly be a chat transfer.

The IR Engine 25 includes a grid editor to provide to the priority to the filters 27.

For example, if the voice filter is present and the chat includes a channel name in the classification, then a typical priority is obtained and the chat is most likely a voice transfer to that channel.

In FIG. 3, the anchor building process 30 uses a chat text 31 to build the anchor. The chat text 31 can be the text provided by the customer or the chat agent. The anchor building process includes various in-processes to build the anchor. In a noun extraction process 32, a part-of-speech (pos) tagger is used to tag the lines in the chat based on the pos information. A pos tagger is a predictive model for predicting a part-of-speech of a word, that is trained on a large corpus of text data, and that learns from a combination of features, such as the n-grams, pos tags of n-grams, etc. The model may be any model, for example, a hidden Markov model, and the features may be any combination of n-grams, pos tags of n-grams, position of words, etc. The first noun from the line of chat text is extracted based on the hypothesis that most of the time the product name is mentioned as the first noun.

In an anchor process 33, a concordance of a concordance is a co-occurrence. In a window of 'n' preceding or succeeding anchor words, the system looks for co-occuring words The concordance can include direction (left window/right window/around window) and the window size. Based on the direction, positive hits are generated by the anchor building process. In a noun phrase extraction process 34, the pos tagger is used to tag the lines in the chat text based on the pos information. The first noun from the line of chat text is extracted based on the hypothesis that most of the time the product name is mentioned as the first noun.

A stopword removal process 35 is used to remove the stopword from the chat text. The stopword removal process involves removing uninteresting, non-informative, or irrelevant words from the chat text. These stopwords are extracted from a file or a database containing list of words maintained on the hard-drive. Most of the time, the team/department names do not contain a stopword. A get unique word process 36 is used to remove multiple occurrences of the same team names. This is done by building a new unique set of words from a list, by removing duplicate entries of team names from the list, and using any algorithm for removing duplicates from a list and copying it to any other data structure, such as, set, dictionary, list, etc.

In a surface-similarity process 37, a surface similarity measure is used to determine an edit-distance at the word level or at the character level. The calculation of edit-distance or Levenshtein distance, is done by calculating the effort that is required to change a first word or character to a second word or character and by providing weights for each step change made to the first word or character, where each step change is any one of substitution, deletion, or addition of a character. Therefore, the edit distance or Levenshtein distance, provides a measure to calculate the similarity of any two words. Based on these similar words, team names are grouped in a category of the team/department.

In an embodiment of the invention, if the chat agent's names are also included as a variable, then the system can help evaluate the chat agents' performance. Agents refer customers to speak to a voice agent because they are not able to resolve the customer's issue at their end. This could either mean that the agent is not empowered to handle the query, or that the agent could not find an appropriate resolution and, hence, was asking the customer to call the call center. As a result of the analysis, embodiments of the invention can both identify the skill issue and the empowerment issue.

Leakage to voice results can be linked to agent and the agent performance and relative scoring of agents with the leakage to voice metric can be analyzed. In an embodiment of the invention, the chat agent performance data can be mapped with a customer satisfaction score (CSAT) driver and, as a result, provide actionable recommendations to the operations and the chat agents (see commonly assigned U.S. patent application publication no. 2010/0262,549, System and Method for Customer Requests and Contact Management, which application is incorporated herein in its entirety by this reference thereto).

Embodiments of the invention can pass contextual information to the voice channel. For purposes of the discussion herein, contextual information is information, such as the plan and/or product that the customer talked about, so that the voice call can resume from that point onwards. For example, a customer X was asking about that iPhone5 in chat and the customer is referred to voice call for an upgrade. As soon as the voice agent picks up the call, the agent can say "How can I help you with iPhone5 upgrade request?" rather than the usual "How can I help you?"

A key aspect of the invention involves passing the insights from one channel to the next channel. If there is a dropout in chat and, for some reason the chat agent is not able to solve the customer problem, then the system can detect the leakage and extract substantially all of the contextual and other relevant information from that chat interaction. The relevant information is summarized and passed to the voice referrals. This removes the need of repeating the process to collect the information and allows the chat agents to communicate intuitively with the customers, thereby resulting in better customer engagement, reduction in drop-offs, and an enhanced overall customer experience.

In an embodiment of the invention, once the leakage in the chat is detected it can be added to a Web-log journey to predict the leakage at the start of the customer journey. A predictive model is built with voice leakage as the response variable and the independent variables are the Web journey, customer historic interactions, and CRM data. A machine learning model can be built to predict whether the customer is likely to end up in an issue that would be referred to voice. Once the likelihood of the customer being referred is high, the customer should not be offered a chat invite or it should be stated upfront, e.g. in case of a button chat, that the issue may not be handled in chat Thus, recommendations can be provided to the chat agents at the start of the chat, based on this detected information. This leads to better engagement of the customer and less leakage of the chats to voice channels, which is relatively costly.

The foregoing description of the specific embodiments can include enhancements of anchor the building process. For example, the grouping of substantially all of the hits in the team category can be performed in other or more intelligent ways, rather than only using the edit distance, including but not limited to, cosine similarity, Levenshtein, Google distance, Bing distance, semantic graph distance, hamming distance, Jaccard, etc.

EXAMPLES

Figure 5A:
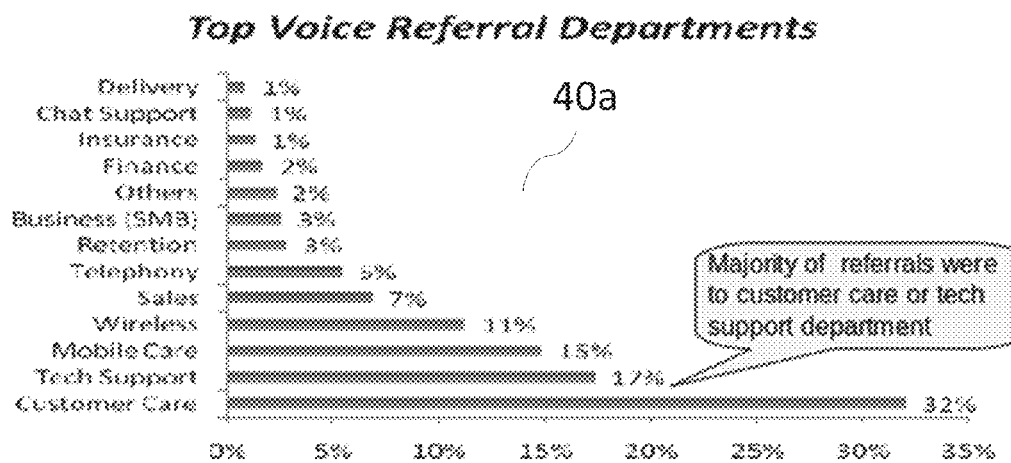
FIGS. 5A and 5B are graphs showing applications of the leakage-to-voice system, as described in connection with FIG. 4, according to the invention.
Figure 5B:
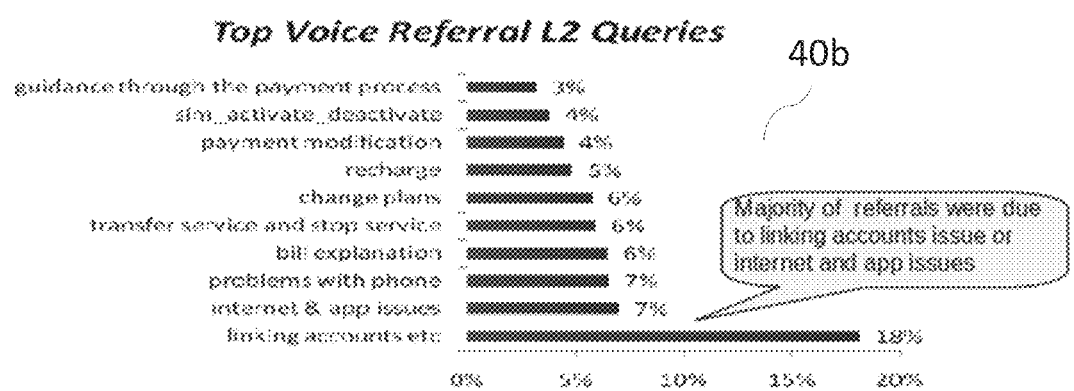

FIGS. 5A and 5B are graphs showing applications of the leakage-to-voice system, as described in connection with FIG. 4, according to the invention. Some of the applications of the herein disclosed invention include making customer recommendations. In such application, the result from leakage-to-voice can be used to provide recommendations for the operation manager, chat agents, customers, and other entities. An example of such impact from leakage-to-voice approach is shown in the FIGS. 5A and 5B.

In FIG. 5A, a graph 40*a* of top voice referral to channels is plotted, which clearly gives many insights for operations and chat agents. The graph 40*a* shows that the majority of referrals are provided to the customer care or technical support channel. Thus, the use of these channels can be actionable recommendations to the operations or the chat agents. Such recommendations can drive better service quality and also improve sales.

In FIG. 5B, a graph 40*b* of top voice referral to queries is plotted using query categorization. The graph 40*b* reflects which of the queries includes highest voice referral and to which channel. In this example, most of the referrals result from linking an account issue. This is clearly an insight that the chat channels handling this query are not skilled enough to handle such query. Thus, such insight can produce an actionable recommendation for operations or the chat agents. For example, this can also be a recommendation for the customer because of the customer infrastructure.

FIG. 6 is a chat transcript showing voice-of-the customer (VoC) visualization of a service chat according to the invention. In FIG. 5, text mining has identified an issue line 50, specific-plain information provided by the agent 52, and specific information from the customer service department 54 that addressed the customer's issue. These insights can be stored in a knowledge base and used to prevent leakage.

FIG. 7 is a chat transcript showing VoC visualization of a sales chat according to the invention. In FIG. 6, text mining has identified that the customer is interested in mowers 60; the customer is provided with a promotional offer 62; the customer response 64 show interest in the offer; the order is passed to order processing 66; an order confirmation 68 is provided; and the agent concludes the transaction by checking for other issues 69. These insights can be stored in a knowledge base and used to prevent leakage. Such insights can include, for example, real time to alerts to agents on potential leakage-to-voice issues; alerts when agents are advising the customer to speak to a voice agent, that this could be possibly solved in chat and the resolution steps; agent training for agents who are referring issues that could be handled in chat-to-voice; and areas where the agent needs to have more empowerment to resolve issues within chats.

Figure 8:
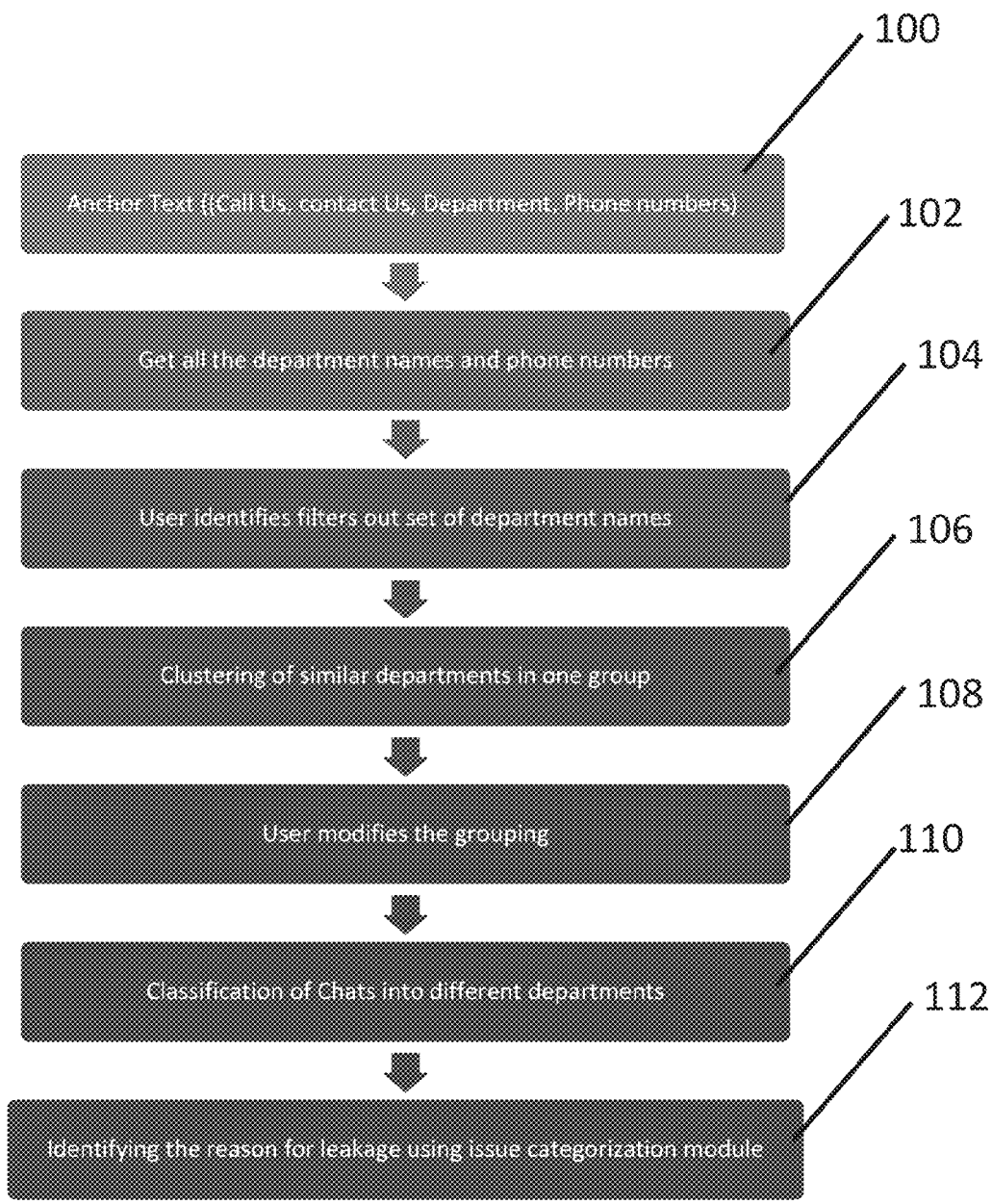
FIG. 8 is a flow diagram showing a leakage-to-voice model according to the invention.

FIG. 8 is a flow diagram showing a leakage to voice model according to the invention. At the start, the system gathers anchor text, e.g. Call Us, contact Us, Department, Phone numbers, etc. 100. The system then gets all the department names and phone numbers 102. The customer identifies and filters out the set of department names 104. Similar departments are clustered into one group 106. The customer modifies the grouping 108. The chats are classified into different departments 110. The reason for leakage is then identified using issue the categorization module 112.

Computer Implementation

The embodiments disclosed herein can be implemented through at least one software program running on at least one hardware device and performing network management functions to control the network elements. The network elements shown in the figures include blocks which can be at least one of a hardware device, or a combination of hardware device and software module.

Figure 9:
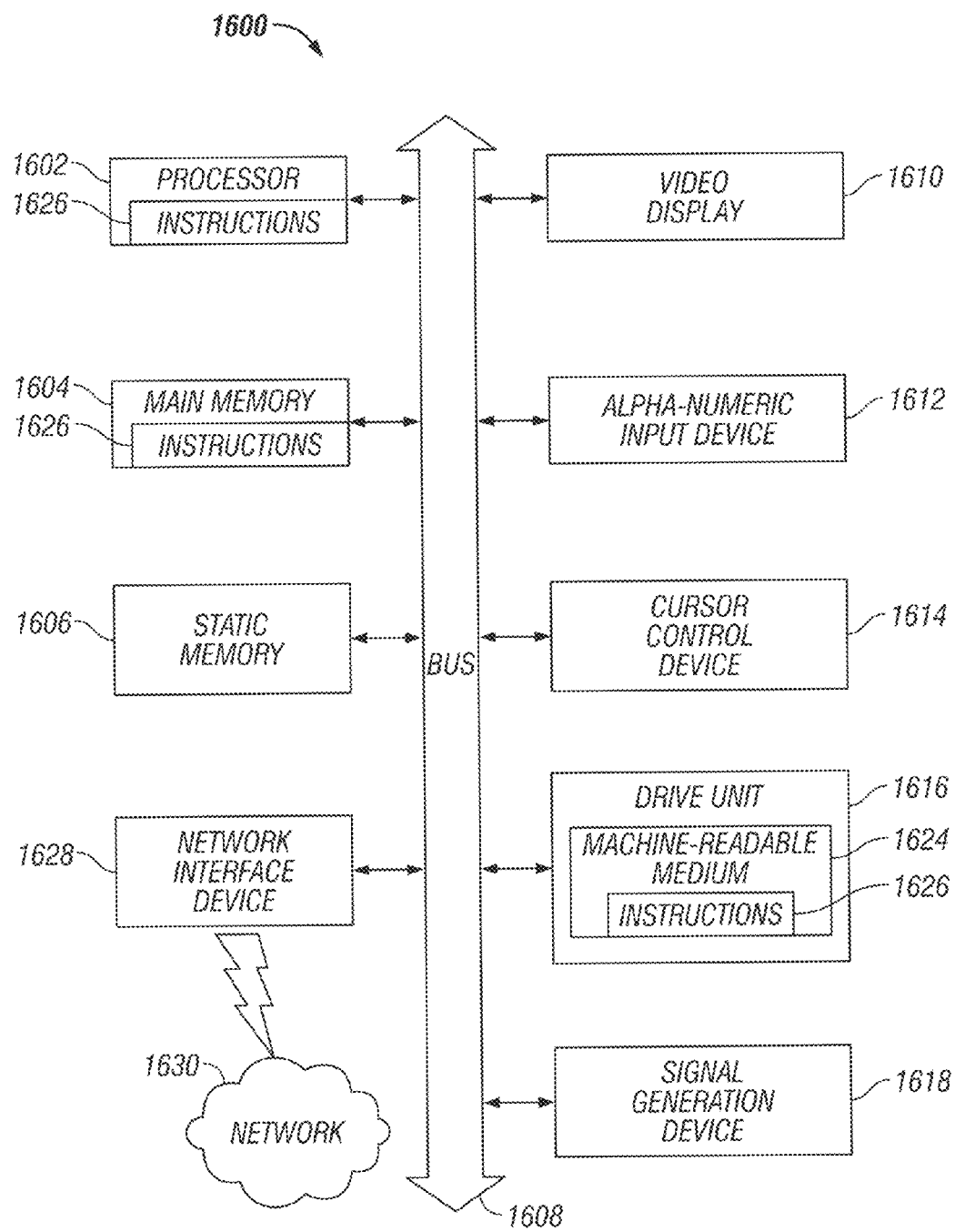
FIG. 9 is a block schematic diagram that depicts a machine in the exemplary form of a computer system within which a set of instructions for causing the machine to perform any of the herein disclosed methodologies may be executed.

FIG. 9 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for analyzing chat leakage, comprising:
   providing a processor configured for obtaining chat-related information from at least one chat session between a customer and an agent;
   said processor configured for identifying customer leakage information from said chat to another channel;
   said processor configured for building a model based on said chat-related information and said leakage information;
   said processor configured for applying said model to provide recommendations to said agent for said customer to improve the customer's experience and accordingly prevent or reduce leakage;
   said applying said model further comprising:
      when chat leakage is identified, analyzing said chat to determine factors that have contributed to said leakage;
      storing data pertaining to said leakage and said analysis results in a knowledge base; and
      using information and analysis thereof stored in said knowledge base to train agents and to make recommendations to agents and managers to improve the customer experience.

2. The method of claim 1, further comprising:
   classifying chats that are identified as having leakage into leakage-to-voice or leakage-to-text chats.

3. The method of claim 1, further comprising:
   said chat agent performing any of providing solutions to customer issues and redirecting said chat to other channels to resolve said customer issues.

4. The method of claim 1, further comprising:
   said chat agent checking information related to the customer, said information comprising any of the customer's journey, the customer's communication history, the customer's interests, and other information associated with the customer.

5. The method of claim 1, wherein the customer's journey comprises any of:
   identity of chat agents, either a voice or a text chat agent, who interacted with the customer before the customer visited a specific chat agent;
   a path taken by the customer to reach a chat agent;
   the customer's Web-log journey; and
   other customer information.

6. The method of claim 1, wherein the customer's journey comprises any of a virtual journey, a literal journey, an assisted journey, a guided journey, and a combination thereof.

7. The method of claim 1, further comprising:
   identifying a channel to which leakage occurs.

8. The method of claim 1, further comprising:
   using sample production data to build said model.

9. The method of claim 1, building said model further comprising:
   using a chat text to build an anchor.

10. The method of claim 9 further comprising:
    extracting channel names referred in the chat text to build said anchor.

11. The method of claim 9, further comprising:
    after said anchor is built, using positive hits generated during anchor building in connection with edit-distance to obtain a temporary categorization of a team/department.

12. The method of claim 11, further comprising:
    business analysts using business sense for each team/department and customer needs to perform an initial grouping of a portion of teams/departments.

13. The method of claim 11, further comprising:
    applying a service layer to fine tune category mapping of said team/department; and
    generating a model that includes a final category for each team/department name.

14. The method of claim 13, wherein said category comprises a categories grouping for each team/department name based on edit distance.

15. The method of claim 11, further comprising:
    after said anchor is built, categorizing said chat data into said team/department names.

16. The method of claim 15, further comprising:
    applying specific filters for voice and text chat categorization.

17. The method of claim 16, wherein said filters and said team/department names occur in a periphery of a predefined number of words; and
    said voice and text chat filters creating dummy data having a periphery of said predefined number of words, instead of using an entire agent chat text; and
    providing said dummy data with a dummy identifier.

18. The method of claim 16, further comprising:
    providing a priority index to control each of said filters.

19. The method of claim 18, further comprising:
    providing a grid editor to provide said priority to said filters.

20. The method of claim 9, wherein said chat text is any of text provided by said customer and by said agent.

21. The method of claim 15, further comprising:
    performing a noun extraction process in which a part-of-speech (pos) tagger is used to tag lines in the chat based on pos information.

22. The method of claim 21, wherein a first noun from the line of chat text is extracted based on the hypothesis that most of the time the product name is mentioned as the first noun.

23. The method of claim 15, further comprising:
    looking up a concordance words with the anchors;
    wherein said concordance comprises any of direction (left window/right window/around window) and the window size; and
    wherein based on the direction, positive hits are generated by the anchor building process.

24. The method of claim 15, further comprising:
performing a noun phrase extraction process in which a part-of-speech (pos) tagger is used to tag lines in the chat text based on pos information.

25. The method of claim 24, wherein a first noun from the line of chat text is extracted based on the hypothesis that most of the time the product name is mentioned as the first noun.

26. The method of claim 15, further comprising:
performing a stopword removal process to remove stopwords from the chat text.

27. The method of claim 15, further comprising:
performing a get unique word process to remove multiple occurrences of the same team/department names.

28. The method of claim 15, further comprising:
performing a surface-similarity process in which a surface similarity measure is used to determine edit-distance at a word level or at a character level; and
grouping team/department names in a category of the team/department based on similar words.

29. The method of claim 15, further comprising:
including the agent's names as a variable for use in evaluating the agents' performance.

30. The method of claim 29, further comprising:
mapping chat agent performance data with a customer satisfaction score (CSAT) driver and;
based thereon, providing actionable recommendations to operations and agents.

31. The method of claim 1, further comprising:
passing contextual information to a voice channel.

32. The method of claim 1, further comprising:
passing insights from one channel to a next channel.

33. The method of claim 1, further comprising:
detecting leakage and extracting substantially all contextual and other relevant information from a chat interaction when there is a customer dropout during a chat and the agent cannot solve the customer problem; and
summarizing said relevant information and passing said summarized information to a voice referral.

34. The method of claim 1, further comprising:
adding information regarding leakage to a Web-log journey to predict leakage at the start of a subsequent customer journey when leakage in a current chat is detected; and
providing recommendations to said agent at the start of said subsequent chat, based on leakage detected in said current chat.

35. The method of claim 1, further comprising:
said processor configured for applying said model to provide off line training analysis.

36. An apparatus for analyzing chat leakage, comprising:
a processor obtaining chat-related information from at least one chat session between a customer and a chat agent;
said processor identifying customer leakage information from said chat to another channel;
said processor building a model based on said chat-related information and said leakage information; and
said processor applying said model to provide recommendations to said chat agent to improve the customer's experience and accordingly prevent or reduce leakage;
said applying said model further comprising:
when chat leakage is identified, analyzing said chat to determine factors that have contributed to said leakage;
storing data pertaining to said leakage and said analysis results in a knowledge base; and
using information and analysis thereof stored in said knowledge base to train agents and to make recommendations to agents and managers to improve the customer experience.

* * * * *